(12) United States Patent
Field et al.

(10) Patent No.: US 6,598,941 B2
(45) Date of Patent: Jul. 29, 2003

(54) APPARATUS AND METHOD FOR ATTACHING A WHEEL TO AN AXLE

(75) Inventors: J. Douglas Field, Bedford, NH (US); Joseph A. Hoell, Jr., Milford, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 77 days.

(21) Appl. No.: 09/790,123

(22) Filed: Feb. 21, 2001

(65) Prior Publication Data

US 2002/0121805 A1 Sep. 5, 2002

(51) Int. Cl.[7] .............................................. B60B 37/00
(52) U.S. Cl. ............................ 301/35.621; 301/111.01; 301/111.03; 301/114
(58) Field of Search .................. 301/35.621, 35.622, 301/35.627, 35.63, 111.01, 111.03, 111.04, 114, 117, 105.1, 131, 35.61; 446/95, 465; 474/165, 166, 198, 903; 403/245

(56) References Cited

U.S. PATENT DOCUMENTS

| | | | |
|---|---|---|---|
| 222,884 A | * 12/1879 | Falb | 301/117 |
| 359,403 A | 3/1887 | Pettinger | |
| 634,151 A | * 10/1899 | Stanton | 301/117 |
| 797,726 A | * 8/1905 | Foster | 301/117 |
| 852,492 A | * 5/1907 | Bitzer | 301/117 |
| 944,936 A | 12/1909 | Barnett | |
| 1,856,866 A | * 5/1932 | Feigelson | 301/35.627 |
| 2,195,590 A | * 4/1940 | Eksergian | |
| 3,321,863 A | * 5/1967 | Maxam, Jr. | |
| 3,909,066 A | * 9/1975 | Snowdon | 301/111.01 |
| 3,963,361 A | 6/1976 | Schenk | |
| 4,473,257 A | * 9/1984 | Gergele | |
| 4,557,526 A | 12/1985 | Smith | |
| 4,639,239 A | 1/1987 | Thirion de Briel et al. | |
| 4,665,766 A | 5/1987 | Umeha et al. | |
| 4,773,889 A | 9/1988 | Rosenwinkel et al. | |
| 5,022,333 A | 6/1991 | McClure et al. | |
| 5,701,965 A | 12/1997 | Kamen et al. | |
| 5,951,422 A | 9/1999 | Roes et al. | |
| 5,971,091 A | 10/1999 | Kamen et al. | |
| 6,224,028 B1 | 5/2001 | Tanaka et al. | |

FOREIGN PATENT DOCUMENTS

FR          000600772 A1    6/1994

* cited by examiner

*Primary Examiner*—Russell D. Stormer
(74) *Attorney, Agent, or Firm*—Bromberg & Sunstein LLP

(57) ABSTRACT

An apparatus and method for attaching a wheel to an axle. The apparatus comprises a wheel with a hub for insertion into an indentation in the end of the axle and a single bolt that is offset from the axis of rotation of the wheel and axle and that attaches the wheel to the axle.

12 Claims, 2 Drawing Sheets

APPARATUS AND METHOD FOR ATTACHING A WHEEL TO AN AXLE

FIELD OF THE INVENTION

The present application is directed to an apparatus and method for attaching a wheel to an axle.

BACKGROUND OF THE INVENTION

Many methods of attaching a wheel to an axle are known in the art. A wheel attachment must both secure the wheel to the axle and transfer angular momentum efficiently from the axle to the wheel.

A common method employs a plurality of lug bolts circumferentially spaced around the longitudinal axis of the axle. The lug bolts are supported by a flange attached to the axle. The wheel is mounted on these lug bolts through holes in the wheel that allow the bolts to pass through the wheel. Lug nuts are screwed onto the lug bolts, forcing the wheel against the flange as the lug nuts are tightened. The lug nuts retain the wheel on the axle and the angular momentum of the axle is transferred to the wheel via the lug bolts. The plurality of lug bolts provides redundancy to the system since a loose lug nut will not cause the wheel to separate from the axle nor will it cause the wheel to slip relative to the rotation of the axle. The disadvantage of using more than one lug bolt to secure the wheel to the axle is the added time required to attach or detach the wheel since more than one lug nut must be screwed or unscrewed from the lug bolts. A second disadvantage is the additional cost associated with manufacturing the flange portion of the axle.

An improved approach for securing a wheel to an axle should: (a) maintain efficient angular momentum transfer from the rotating axle to the wheel; (b) provide quick and easy attachment and detachment of the wheel from the axle; and (c) improve manufacturability by simplifying the design of the wheel and axle mating surfaces. Embodiments of the present invention address each of these needs.

SUMMARY OF THE INVENTION

In accordance with preferred embodiments of the present invention, a system is provided for securing a wheel to an axle. The system has (a) an axle with a wheel-coupling end, having an indentation for insertion of a wheel hub; (b) a threaded bolt hole parallel to the longitudinal axis of the axle and offset from the longitudinal axis; (c) a wheel having a clearance hole parallel to and offset from the rotational axis of the wheel and a hub that is inserted into the indentation in the wheel-coupling end of the axle; and (d) a bolt having a threaded end for insertion through the clearance hole, for securing the wheel to the axle.

In accordance with a further embodiment of the invention, a system is provided that has: (a) an axle having an indentation at a distal end for a wheel hub; (b) a lug stud, nonconcentric with the axle, extending from the distal end of the axle; (c) a wheel having a clearance hole to admit the lug stud, the clearance hole offset from the center of the wheel; (d) a wheel hub, that is inserted into an indentation in the end of the axle; and (e) a lug nut for attaching the wheel to the lug stud In accordance with a further embodiment of the invention, there is provided a method for securing a wheel to an axle. The method has the steps of: aligning the rotational axis of the wheel with the longitudinal axis of the axle; inserting the wheel hub into an indentation in an end of the axle; and fastening the wheel to the axle at a single point offset from the rotational axis of the wheel.

DESCRIPTION OF PREFERRED EMBODIMENTS

Figure 1:
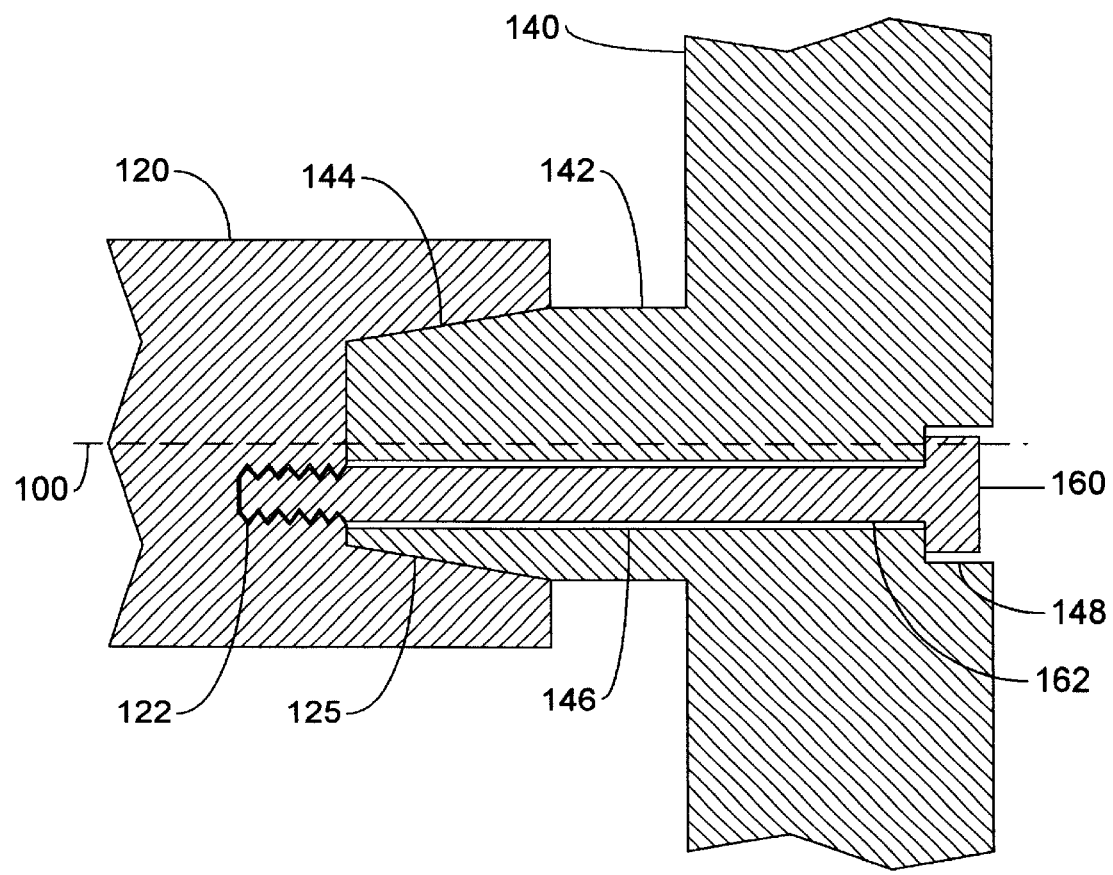
FIG. 1 shows a sectional side view of one embodiment of the present invention.

FIG. 1 shows a sectional side view of one embodiment of the present invention which advantageously couples a wheel to an axle. An axle 120 has a longitudinal axis 100. The wheel-coupling end of the axle has a tapered indentation 125 centered on the axle's longitudinal axis 100. Wheel 140 includes a hub 142 that is centered on the wheel's rotational axis, extending along the wheel's rotational axis. The term "wheel" as used in this description and in any appended claims will be understood to include any element that turns about an axis of rotation, transforming angular momentum to linear momentum by rolling along a surface. As used in this description and in any appended claims, the term "hub" will be understood to encompass any arbitrarily-shaped protrusion from the wheel that is concentric with the rotational axis of the wheel.

The hub 142 has a tapered end 144 that is shaped and sized to fit into the tapered indentation 125 such that when the hub 142 is seated in the tapered indentation 125, the longitudinal axis of the axle 100 and the rotational axis of the wheel are coincident. The hub 142 includes a clearance hole 146, the hole having an axis that is parallel to, but not coincident with, the rotational axis 100 of the wheel. The clearance hole may have a counter-bore 148 and is sized to allow the insertion of a fastener, such as a bolt 160 with a bolt shaft 162, into the clearance hole 146. The bolt 160 is screwed into the threaded bolt hole 122 in the axle 120, securing the wheel 140 to the axle 120.

As the bolt 160 is tightened, the wheel 140 is forced against the axle, producing a force component normal to the tapered surface of the hub 142. The normal force generates a frictional force on the tapered surface of the hub and the tapered surface of the indentation of the rotating axle thereby efficiently transferring the angular momentum of the rotating axle to the wheel. If the bolt loosens and the tapered surfaces begin to slip, the offset of the bolt from the longitudinal axis of the axle places the lug bolt in shear and therefore creates a torque on the wheel that continues to drive the wheel. By offsetting the clearance hole, and, therefore, the bolt, from the rotational axis of the wheel, the present invention provides a redundant drive mechanism for the wheel, while using only a single bolt.

Figure 2:
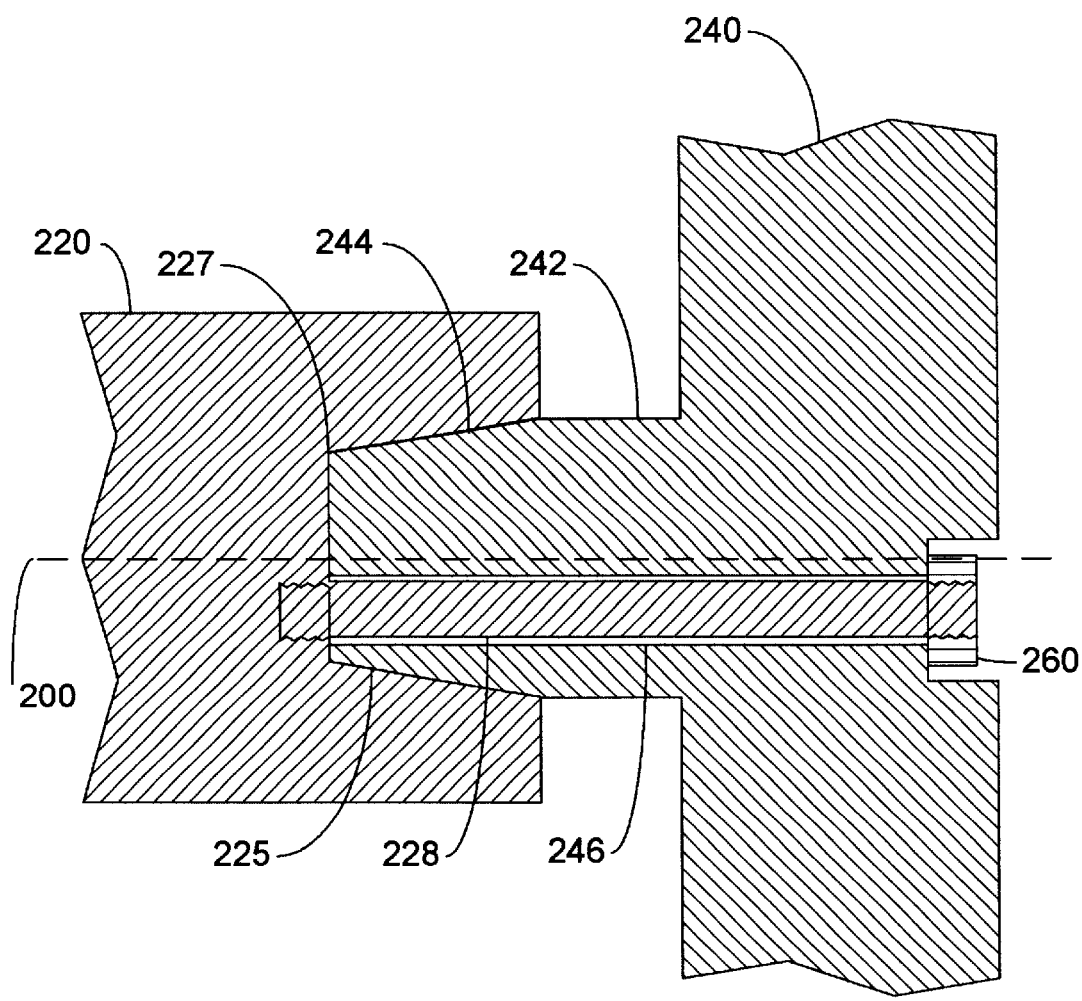
FIG. 2 shows a sectional side view of another embodiment of the present invention.

FIG. 2 shows a sectional side view of another embodiment of the present invention. An axle 220 has a longitudinal axis of rotation 200. The distal end of the axle has a tapered indentation 225 that is centered on the longitudinal axis of the axle 200. A fastener, such as a lug stud 228, extends from the bottom 227 of the tapered indentation 225 and has an axis that is parallel to but not coincident with the longitudinal axis of the axle 200. A wheel 240 includes a hub 242 that is centered on the wheel's rotational axis and extends along the wheel's rotational axis. The hub 242 has a tapered end 244 that is shaped and sized to fit into the tapered indentation 225 such that when the hub 242 is seated in the tapered indentation 225, the longitudinal axis of the axle 200 and the rotational axis of the wheel are coincident. The hub 242 includes a clearance hole 246 positioned and sized to allow the lug stud 228 to pass through the hub 242. A lug nut 260, secures the wheel 240 to the axle 220.

What is claimed is:

1. A wheel and axle system, the system comprising:
   a. an axle having a longitudinal axis and a wheel-coupling end, the wheel-coupling end having an indentation in the wheel-coupling end substantially concentric with the longitudinal axis;
   b. a wheel having a rotational axis, and a clearance hole parallel to and offset from the rotational axis of the wheel, the wheel further comprising a hub for insertion into the indentation in the wheel-coupling end of the axle; and
   c. a fastener, for insertion through the clearance hole for securing the wheel to the axle.

2. A wheel and axle system as claimed in claim 1, wherein the fastener is a threaded bolt.

3. A wheel and axle system, the system comprising:
   a. an axle having an indentation at a distal end for a wheel hub;
   b. a lug stud, nonconcentric with the axle, extending from the distal end of the axle;
   c. a wheel having a rotational axis through a center and a clearance hole to admit the lug stud, the clearance hole offset from the center of the wheel and parallel to the rotational axis;
   d. a wheel hub, the wheel hub connected to the wheel and disposed within the indentation of the axle; and
   e. a lug nut for attaching the wheel to the lug stud.

4. A method for attaching a wheel to an axle, the wheel having a rotational axis and a hub centered about the rotational axis and the axle having a longitudinal axis, the method comprising:
   a. aligning the rotational axis of the wheel with the longitudinal axis of the axle;
   b. inserting the wheel hub into an indentation in an end of the axle, the indentation substantially concentric with the longitudinal axis of the axle; and
   c. fastening the wheel to the axle at a point offset from the rotational axis of the wheel.

5. The method of claim 4, wherein the step of fastening the wheel to the axle includes inserting a lug stud, attached to the axle, through a clearance hole in the wheel and securing the lug stud with a lug nut.

6. The method of claim 4, wherein the step of fastening the wheel to the axle includes inserting a bolt through a clearance hole in the wheel and into a threaded hole in the axle.

7. A wheel, the wheel characterized by a rotational axis and a plane of rotation, the wheel comprising:
   a. a clearance hole parallel to and offset from the rotational axis of the wheel for admission of a fastener; and
   b. a hub extending about the rotational axis outside the plane of rotation for insertion into an indentation in a wheel-coupling end of an axle, the indentation substantially concentric with the longitudinal axis of the axle.

8. A wheel as claimed in claim 7, wherein the fastener is a threaded bolt.

9. A wheel as claimed in claim 7, wherein the fastener is a lug stud coupled to the indentation of the axle.

10. An axle, the axle characterized by a longitudinal axis, the axle comprising:
    a. an indentation at a distal end for a wheel hub, the indentation substantially concentric with the longitudinal axis of the axle; and
    b. a fastener, nonconcentric with the axle, extending from the distal end of the axle for securing a wheel.

11. An axle as claimed in claim 10, wherein the fastener is a lug stud.

12. An axle, the axle characterized by a longitudinal axis, the axle comprising:
    a. an indentation at a distal end for a wheel hub; and
    b. a threaded bolt hole parallel to the longitudinal axis of the axle and offset from the longitudinal axis for receiving a bolt to secure a wheel.

* * * * *